United States Patent

Balk

(10) Patent No.: US 9,409,715 B2
(45) Date of Patent: Aug. 9, 2016

(54) CONVEYOR COMPRISING TWO HELICAL TRACKS CONNECTED BY A BRIDGING TRACK

(71) Applicant: Ambaflex International B.V., Zwaag (NL)

(72) Inventor: Wouter Balk, Baambrugge (NL)

(73) Assignee: AMBAFLEX INTERNATIONAL B.V., Zwaag (NL)

( * ) Notice: Subject to any disclaimer, the term of this patent is extended or adjusted under 35 U.S.C. 154(b) by 0 days.

(21) Appl. No.: 14/441,120

(22) PCT Filed: Nov. 8, 2013

(86) PCT No.: PCT/NL2013/050796
§ 371 (c)(1),
(2) Date: May 6, 2015

(87) PCT Pub. No.: WO2014/073961
PCT Pub. Date: May 15, 2014

(65) Prior Publication Data
US 2015/0291360 A1     Oct. 15, 2015

(30) Foreign Application Priority Data
Nov. 9, 2012 (NL) ..................................... 2009781

(51) Int. Cl.
*B65G 21/18* (2006.01)
*B65G 17/06* (2006.01)
(Continued)

(52) U.S. Cl.
CPC .............. *B65G 17/066* (2013.01); *B65G 15/24* (2013.01); *B65G 17/30* (2013.01); *B65G 21/18* (2013.01); *B65G 2207/24* (2013.01)

(58) Field of Classification Search
CPC ............................ B65G 21/18; B65G 2207/24
USPC .......................................... 198/778; 193/35 S
See application file for complete search history.

(56) References Cited

U.S. PATENT DOCUMENTS 3,348,659 A * 10/1967 Roinestad .............. B65G 21/18
                                                  198/778
6,244,168 B1 * 6/2001 van de Vorst ............ A21B 1/48
                                                  99/443 C (Continued)

FOREIGN PATENT DOCUMENTS

| EP | 0578523 | 1/1994 |
| EP | 1437076 | 7/2004 |

(Continued)

OTHER PUBLICATIONS

International Search Report for corresponding foreign application PCT/NL2013/050796, filed Nov. 8, 2013.

*Primary Examiner* — James R Bidwell
(74) *Attorney, Agent, or Firm* — Steven Koehler; Westman, Champlin & Koehler

(57) ABSTRACT

A conveyor comprises two helical conveying tracks and a bridging track which connects the two helical conveying tracks to each other such that products can be transported upwardly via one helical conveying track, then via the bridging track to the other helical conveying track and subsequently downwardly via the other helical conveying track. The conveyor is provided with a driveable endless conveyor belt which follows at least one of the helical conveying tracks, at least a part of the bridging track and a return track. The return track at the one helical conveying track has a vertically oriented portion and a horizontally oriented portion. The horizontally oriented portion is disposed below the bridging track and extends beyond the vertically oriented portion with respect to the center line of the one helical conveying track.

18 Claims, 4 Drawing Sheets

(51) Int. Cl.
 *B65G 15/24* (2006.01)
 *B65G 17/30* (2006.01)

(56) References Cited

U.S. PATENT DOCUMENTS

| | | | | |
|---|---|---|---|---|
| 6,658,993 | B2* | 12/2003 | Kuenen | A21B 1/48 99/386 |
| 7,107,899 | B2* | 9/2006 | Nothum, Jr. | A21B 1/42 99/386 |
| 8,302,763 | B2* | 11/2012 | Broers | B65G 21/18 198/778 |
| 2005/0092730 | A1 | 5/2005 | Nothum, Jr. | |
| 2010/0089724 | A1 | 4/2010 | Broers | |

FOREIGN PATENT DOCUMENTS

| | | |
|---|---|---|
| EP | 1902978 | 3/2008 |
| JP | S5336747 | 3/1978 |
| JP | S5743782 | 3/1982 |
| JP | H04217504 | 8/1992 |

* cited by examiner

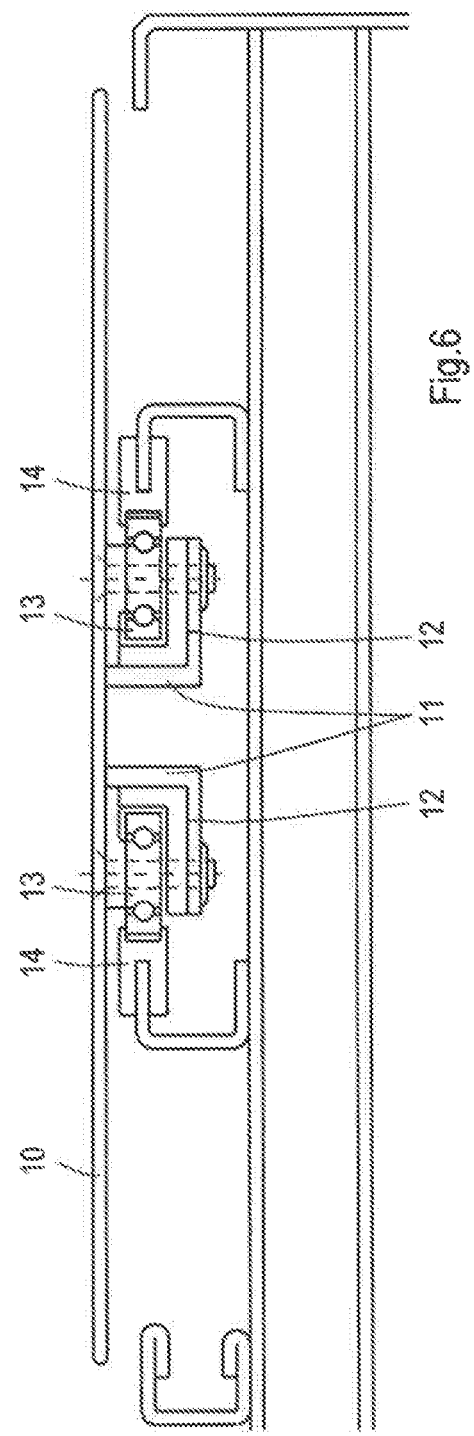

CONVEYOR COMPRISING TWO HELICAL TRACKS CONNECTED BY A BRIDGING TRACK

CROSS-REFERENCE TO RELATED APPLICATION

The present application is a national stage filing of International patent application Serial No. PCT/NL2013/050796, filed Nov. 8, 2013, and published as WO 2014/073961 A1 in English.

BACKGROUND

The discussion below is merely provided for general background information and is not intended to be used as an aid in determining the scope of the claimed subject matter.

Aspects of the invention relate to a conveyor comprising two helical conveying tracks located at a distance from each other and a bridging track which connects the two helical conveying tracks to each other such that products can be transported upwardly via one helical conveying track, then via the bridging track to the other helical conveying track and subsequently downwardly via the other helical conveying track.

Such a conveyor is known as a so-called portal conveyor. The known conveyor comprises two helical conveying tracks, each of them being provided with a driveable endless conveyor belt and a horizontal bridging track which is also provided with a driveable endless conveyor belt. Since the helical conveying tracks are located at a distance from each other and the bridging track is located at a certain height there is a passage through the conveyor. The passage provides the possibility to pass another transport through the conveyor, for example, without obstructing the product flow in the conveyor. The known conveyor appears to be less suitable for conveying small and/or less stable products.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A conveyor is provided with a driveable endless conveyor belt which follows at least one of the helical conveying tracks, at least a part of the bridging track and a return track, wherein the return track at said one helical conveying track has a vertically oriented portion and a horizontally oriented portion, which horizontally oriented portion is disposed below the bridging track and extends beyond the vertically oriented portion with respect to the center line of the one helical conveying track, wherein the lower side of the conveyor belt is provided with guide elements which are guided via guiding rails along the helical conveying track, the bridging track and the return track.

The horizontally oriented portion of the return track in fact defines an upper wall of an underpass between the helical conveying tracks. The conveyor provides the possibility to apply less than three endless conveyor belts, such that in the bridging track less than two transitions between two conveyor belts are required, as well. This reduces the risk of malfunctions as a consequence of such transitions, particularly in case of unstable products. Furthermore, due to the lower number of conveyor belts less drive motors are required than in case of conventional portal conveyors. This saves both purchasing costs and maintenance and control of the drive means.

The conveyor belt has an upper side or product supporting side on which products can be supported in the helical conveying track and the bridging track. The lower side of the conveyor belt is provided with guide elements which are guided via guiding rails along the helical conveying track, the bridging track and the return track. The lower side of the conveyor belt can also be guided in a curve between the horizontally oriented and vertically oriented portion of the return track. This means that, for example, in such a so-called reversed bend a roller along which the upper side of the conveyor belt is guided, may be omitted. This appears to be sensitive to malfunctions in practice, since the upper side of the conveyor belt may comprise dirt which can accumulate between such a roller and the conveyor belt. Besides, such a roller takes up space, such that the passage between the helical conveying tracks is limited. Since the conveyor belt is also guided at its back side in the horizontally oriented portion of the return track, hanging of the conveyor belt at the passage is prevented.

JPS 57 43782 and JPS 53 36747 are related to conveyors wherein the conveyor belts are driven by drums and the upper and lower sides of the conveyor belts are guided along rollers. The conveyor according to the present disclosure is of a different type since the conveyor belt includes guide elements. Because of guiding the lower side the conveyor belt may transfer from the horizontally oriented portion to the vertically oriented portion at the reversed bend in the return track through a single right-angled curve. This creates a larger passage than in case of the double bends as disclosed in JPS 57 43782 and JPS 53 36747. The conveyor belt in the conveyor according to the present disclosure is preferably not driven by means of a drum, but by means of a motor which is disposed at the end of the helical track and engages the lower side of the conveyor belt and pulls the conveyor belt. If the conveyor belt comprises a chain, for example, the motor can drive the conveyor belt via a sprocket. The helical track may be a static helical frame along which the driveable conveyor belt may be guided.

EP 0 578 523 is related to a device including a cooking chamber, a refrigeration chamber and a conveyor belt which successively follows an ascending helical spiral through the cooking chamber and a descending helical spiral through the refrigeration chamber. The conveyor belt of the conveyor according to the present disclosure would not be able to follow a track according to EP 0 578 523 because of the presence of the guide elements. Furthermore, the vertical portion of the return track is not disposed at the helical conveying track and the horizontally oriented portions in the return track below the bridging track are absent, such that no passage is created.

The distance between the bridging track and the horizontally oriented portion of the return track may be smaller than the pitch between one or two turns of the helical conveying track, for example, but that is not necessary.

Preferably, the endless conveyor belt follows both helical conveying tracks and the bridging track, and the return track has a vertically oriented portion at the other helical conveying track. In this case the return track has two vertically oriented portions and one horizontally oriented portion which extends directly below the bridging track. This embodiment does not have a transition between two separate conveyor belts, such that products can be transported in a very stable manner.

In an alternative embodiment a reversing member is disposed between the bridging track and the horizontally oriented portion of the return track for reversing the transport direction of the conveyor belt. This means, that there is a transition in the bridging track at the reversing member, because the conveyor belt then follows the return track instead of the bridging track. The conveyor may have a second conveyor belt which at least follows the other helical conveying track and will also have a reversing member at the transition such that there is a transition between the separate conveyor belts. The reversing member or reversing members may comprise a reversing roller or sprocket, for example.

The reversing member may be located halfway of the bridging track.

In an alternative embodiment the reversing member is located in an end portion of the bridging track. This means that the conveyor belt follows the one helical transport track, substantially the entire bridging track and the return track. In this case the other helical track may comprise a conventional helical conveyor, wherein a corresponding conveyor belt follows the other helical track and a vertical return track along the helical track. The transition between the separate conveyor belts is then determined by the reversing member in the bridging track, on the one hand, and the curve between the vertical return track and a horizontal portion which connects to the upper side of the other helical track, on the other hand. In that case the horizontal portion lies at the end of the bridging track. In the curve a reversing roller may be mounted for guiding the conveyor belt between the vertical return track and the horizontal portion, for example.

The bridging track may extend substantially linearly, but alternative shapes are also conceivable.

In a practical embodiment the guide elements comprise rollers which are received in a groove of the guiding rails.

The conveyor belt may be provided with slats which are mutually coupled and moveable with respect to each other.

The slats may be coupled to each other via a driveable endless connecting member, for example a chain to which a central portion of each slat is coupled. Each slat may be provided with rollers at its lower side which are guided by the guiding rails.

The minimum bending radius of the conveyor belt about its upper side may be larger than about its lower side. When the conveyor belt at the bridging track is reversed to the horizontally oriented portion of the return track, the conveyor belt is bent about its lower side, and when the conveyor belt transfers from the horizontally oriented portion of the return track to the vertically oriented portion the conveyor belt is bent about its upper side. In the latter case one speaks about a reversed bend. If the minimum bending radius of the conveyor belt about its upper side is larger than about its lower side, this means that the conveyor belt can follow a smaller curve about its lower side than about its upper side. This is typically the case for a slats belt which is provided with guide elements at its lower side. When the slats belt is bent about its lower side the slats will move away from each other, but when the slats belt is bent about its upper side the slats will move towards each other and touch each other earlier such that the minimum bending radius is larger. Because of the relatively large minimum bending radius a curve of 180° about the upper side is avoided with such a conveyor belt, since this takes relatively much space.

The present disclosure is also related to a conveyor according to claim 12 or 13. The conveyor according to claim 12 comprises only one endless conveyor belt, whereas the conveyor according to claim 13 comprises only two endless conveyor belts. This means that at the bridging track there is no or only one transition between separate conveyor belts, respectively, which provides the above-mentioned advantages.

BRIEF DESCRIPTION OF THE DRAWINGS

Aspects of the present invention will hereafter be elucidated with reference to drawings showing embodiments of the invention very schematically.

FIG. 6 is a cross-sectional view of an embodiment of a conveyor belt for the conveyor.

DETAILED DESCRIPTION OF THE ILLUSTRATIVE EMBODIMENTS

Figure 1:
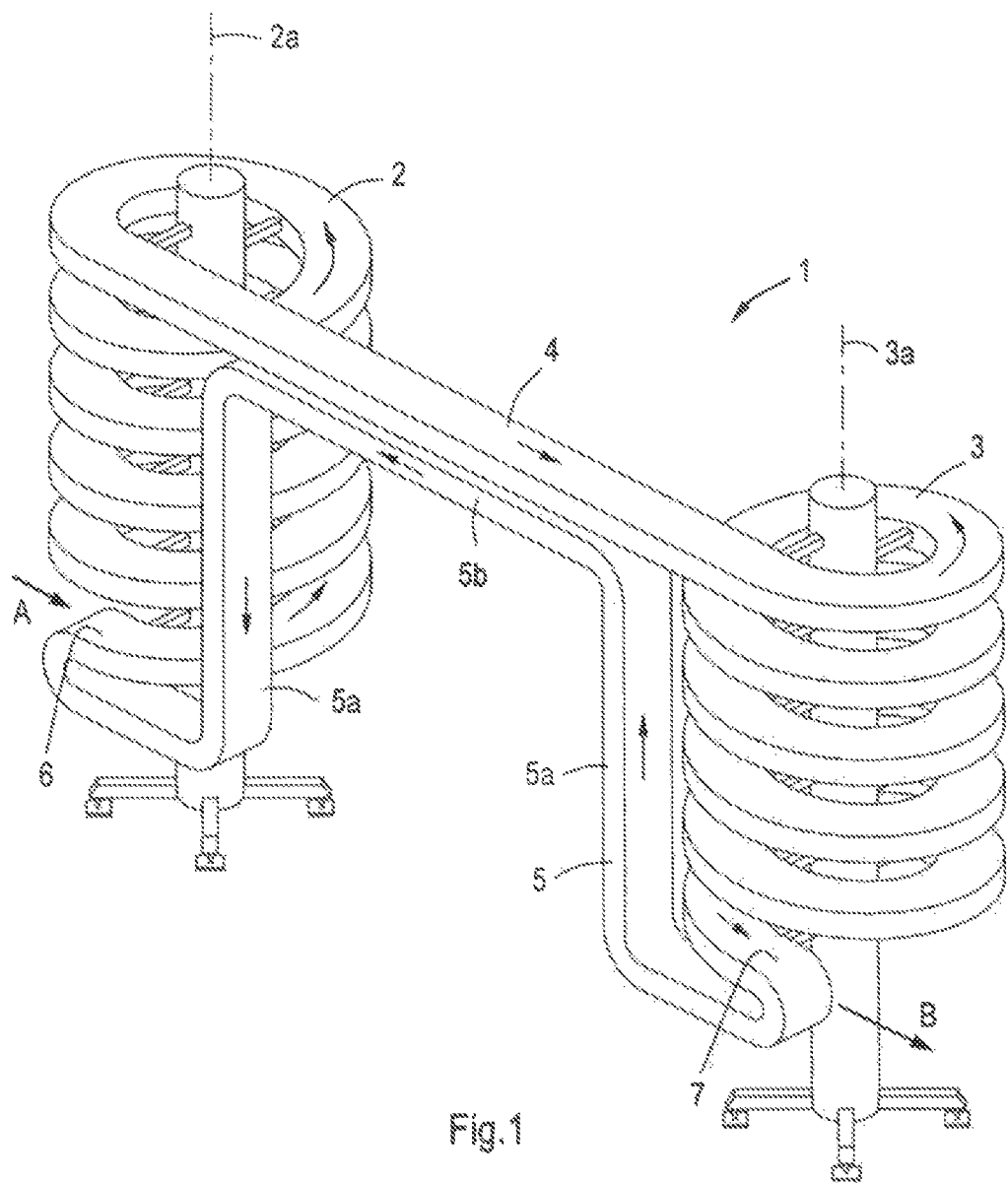
FIG. 1 is a perspective top view of an embodiment of a conveyor.
Figure 2:
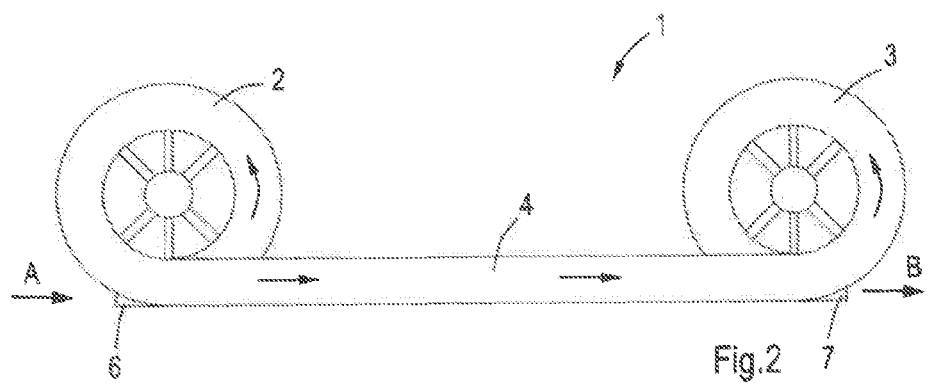
FIG. 2 is a top view of the conveyor according to FIG. 1.
Figure 3:
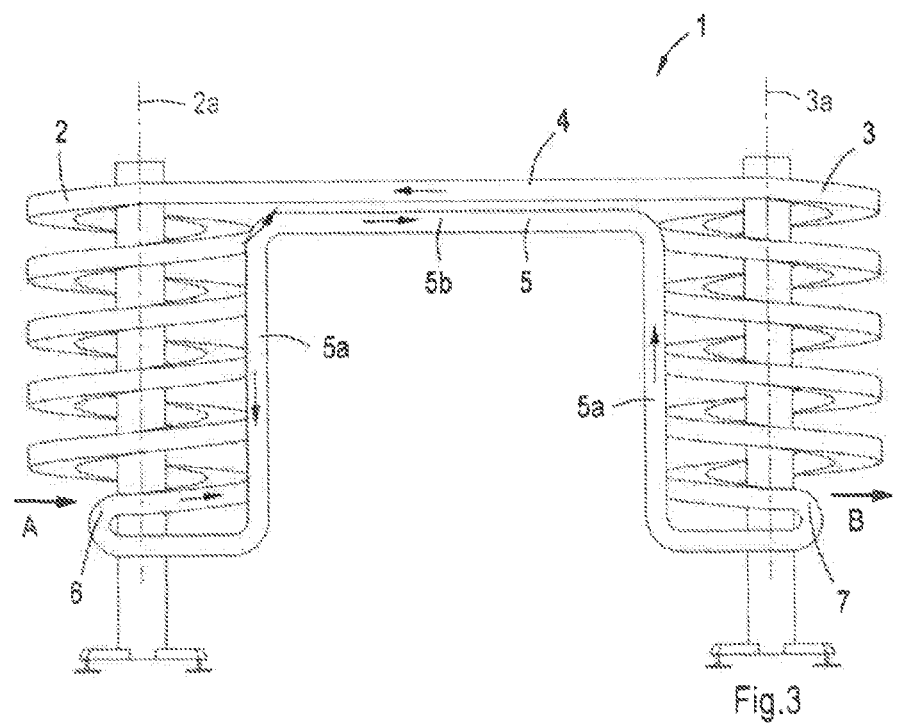
FIG. 3 is a side view of the conveyor according to FIG. 1.

FIGS. 1-3 show a first embodiment of a conveyor 1. The conveyor 1 comprises a first helical conveying track 2 and a second helical conveying track 3. Both helical conveying tracks 2, 3 have respective vertical center lines 2a, 3a, which extend parallel and vertically in this embodiment. The first and second helical conveying tracks 2, 3 are located at a distance from each other, such that there is a passage between the helical conveying tracks 2, 3.

The conveyor 1 further comprises a bridging track 4, which connects the first helical conveying track 2 with the second helical conveying track 3. The bridging track 4 extends between both helical conveying tracks 2, 3. The embodiment of the conveyor according to FIGS. 1-3 is provided with one driveable endless conveyor belt which successively follows the first helical conveying track 2 upwardly, the bridging track 4 from the first helical conveying track 2 to the second helical conveying track 3, and the second helical conveying track 3 downwardly, as indicated by arrows in the figures. The conveyor belt moves from the second helical conveying track 3 back to the first helical conveying track 2 via a return track 5. The helical conveying tracks 2, 3 may be provided with static helical frames along which the conveyor belt is guided.

In practice products are placed on the conveyor belt at a supply 6 of the conveyor 1 at the lower side of the first helical conveying track 2, as indicated by arrow A. A supplying conveyor may be disposed upstream of the supply 6, for example. The products are transported via the bridging track 4 across the passage between both helical conveying tracks 2, 3 and leave the conveyor 1 at a discharge 7 at the lower side of the second helical conveying track 3, as indicated by arrow B. A discharging conveyor may be placed here for receiving and discharging products. Since in this embodiment only one endless conveyor belt follows the entire track from the supply 6 to the discharge 7 there is no transition which might form a risk for less stable products.

The return track 5 has two vertically oriented portions 5a and a horizontally oriented portion 5b. The vertically oriented portions 5a are disposed at outer sides of the respective helical conveying tracks 2, 3 between the respective center lines 2a, 3a. Although the vertically oriented portions 5a of the return track 5 in this embodiment are vertical, it is conceivable that they are angled with respect to the vertical, as long as there is a passage between the vertically oriented portions 5a. The horizontally oriented portion 5b of the return track 5 is disposed below the bridging track 4 and extends between the vertically oriented portions 5a. Hence, the transport directions of the conveyor belt in the bridging track 4 and the horizontally oriented portion 5b are opposite to each other. In the shown embodiment the horizontally oriented portion 5b extends parallel to the bridging track 4 and extends linearly.

Furthermore, the vertically oriented portions 5a extend upwardly beyond the supply 6 and the discharge 7. The horizontally oriented portion 5b is also disposed above the supply 6 and the discharge 7 and therefore provides an underpass which extends above the supply 6 and the discharge 7. It is noted that the return track 5 between the discharge 7 and the vertically oriented portion 5a at the second helical conveying track 3, and between the supply 6 and the vertically oriented portion 5a at the first helical conveying track 2 in this embodiment are also oriented horizontally. However, these portions are also disposed below the respective discharge 7 and supply 6 and between the respective vertically oriented portions 5a and the center lines 3a, 2a of the corresponding helical conveying tracks 3, 2. Furthermore, it is noted that the bridging track 4 is longer than the horizontally oriented portion 5b of the return track 5. The bridging track 4 extends further at opposite sides of the horizontally oriented portion 5b between the respective vertically oriented portions 5a and the corresponding center lines 2a and 3a. FIG. 2 shows that the bridging track 4 connects tangentially to both helical tracks 2, 3.

At the supply 6 and the discharge 7 the conveyor 1 may be provided with reversing rollers for reversing the direction of the conveyor belt. Reversing rollers may also be disposed at the curves between the vertically oriented portions 5a and the horizontally oriented portions below the supply 6 and the discharge 7 in order to achieve a change in direction of the conveyor belt between horizontal and vertical.

In the curves between the vertically oriented portions 5a and the horizontally oriented portion 5b of the return track 5 the conveyor belt must bend in opposite direction with respect to the above-mentioned curves. Possibly, also rollers might be disposed at these curves in order to guide changes of direction of the conveyor belt from vertical to horizontal and again back to vertical. However, in practice it may be desired to apply no rollers at these transitions, since they are sensitive to dirt which may be present on the upper side of the conveyor belt.

Several types of conveyor belts are conceivable. A possible embodiment is depicted in cross-section in FIG. 6. In this case the conveyor belt is provided with a large number of slats 10 which are mutually coupled via an endless connecting member, such as a side-bow chain. The connecting member is disposed between vertical flanges 11 of each slat 10 and is connected to the flanges 11. Feet 12 which are directed outwardly are disposed at the lower sides of the flanges 11. Rollers 13 having vertical rotating shafts are located at the feet 12. The rollers 13 are received in groove-shaped guides 14, which follow the first and second helical tracks 2, 3, the bridging track 4 and the return track 5. In the embodiment of the conveyor belt as shown in FIG. 6 it is possible to omit the above-mentioned rollers in curves for effecting a change of direction of the conveyor belt, particularly in a reversed bend at the transition between the horizontally oriented portion 5b and the vertically oriented portions 5a of the return track 5.

In fact the return track forms a reversed-U-shaped portal which has a vertically oriented portion 5a at each helical conveying track 2, 3 and which has a horizontally oriented portion 5b which is disposed below the bridging track 4, in the embodiment shown in FIGS. 1 and 3 parallel thereto.

Figure 4:
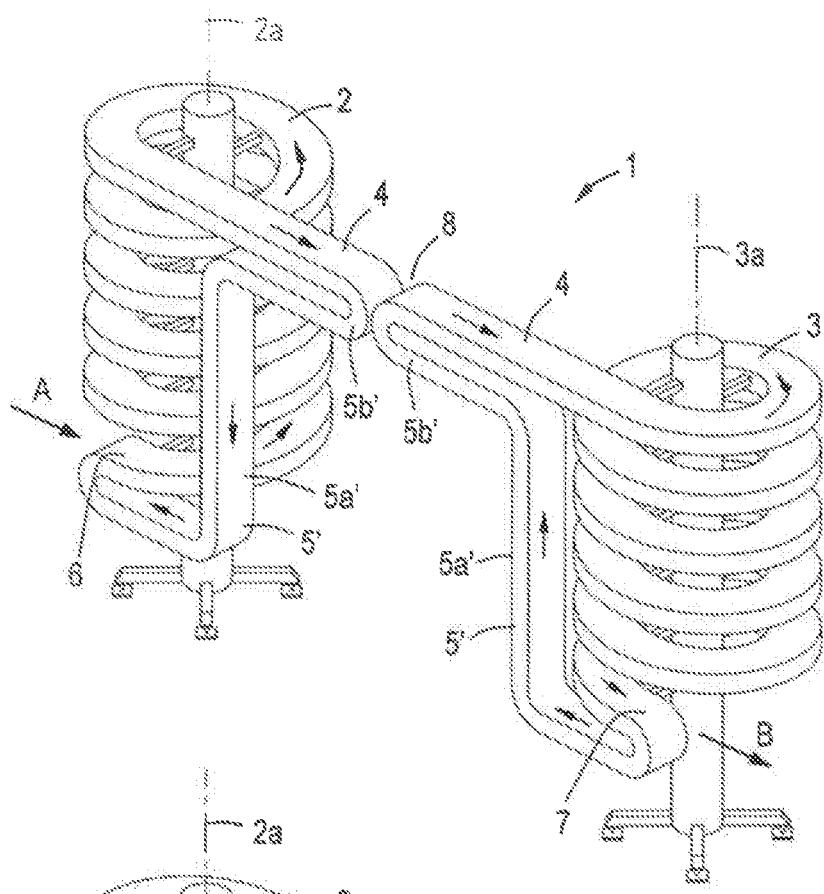
FIG. 4 is a similar view as FIG. 1 showing an alternative embodiment of the conveyor.

FIG. 4 shows an alternative embodiment of the conveyor 1. In this case the conveyor 1 is provided with a transition 8 at the bridging track 4, since the conveyor 1 comprises two endless conveyor belts. Similar to the embodiment as shown in FIGS. 1-3 products are transported from the supply 6 via the first helical conveying track 2 via the bridging track 4 including the transition 8 to the second helical conveying track 3 and downwardly via the second helical conveying track 3 to the discharge 7.

Considering the track followed by one of the endless conveyor belts, for example at the first helical conveying track 2, it follows from the supply 6 the first helical conveying track 2 upwardly, a portion of the bridging track 4 and the return track 5'. In this embodiment the return track 5' has a vertically oriented portion 5a' and a horizontally oriented portion 5b'. The horizontally oriented portion 5b' is disposed below the portion of the bridging track 4 and extends beyond the vertically oriented portion 5a' with respect to the center line 2a of the first helical conveying track 2.

The other conveyor belt at the second helical conveying track 3 follows a comparable track downwardly. In this embodiment the transition 8 is located halfway of the bridging track 4, but a different location is conceivable. A reversing member is disposed between the bridging track 4 and the return track, for example a reversing roller, which causes the conveyor belt to follow a first portion of the bridging track 4 and the horizontally oriented portion 5b' of the return track 5' at the reversing member in opposite direction.

Figure 5:
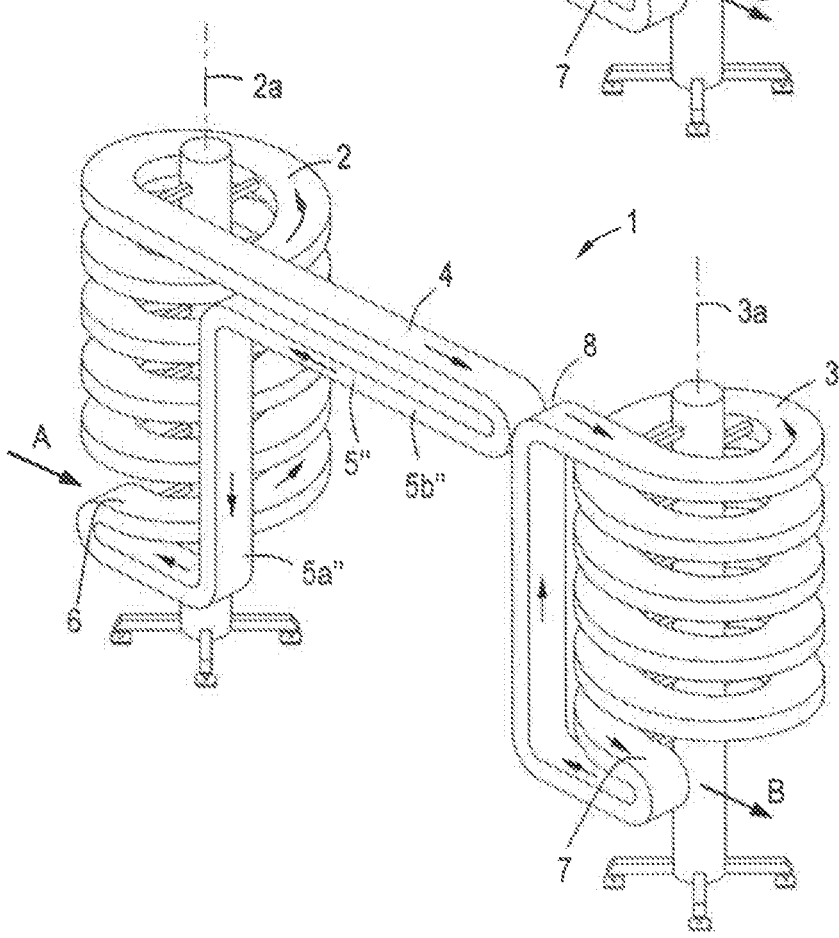
FIG. 5 is similar view as FIG. 1 showing another alternative embodiment of the conveyor.

FIG. 5 shows another alternative embodiment of the conveyor 1. In this case the conveyor 1 is also provided with a transition 8 at the bridging track 4, but this is now located in an end portion of the bridging track 4. The endless conveyor belt at the first helical conveying track 2 follows from the supply 6 the first helical conveying track 2 upwardly, nearly the entire bridging track 4 and the return track 5". In this embodiment the return track 5" has a vertically oriented portion 5a" and a horizontally oriented portion 5b" back to the supply 6. The horizontally oriented portion 5b" is disposed below the bridging track 4 and extends beyond the vertically oriented portion 5a" with respect to the center line 2a of the first helical conveying track 2.

The other endless conveyor belt at the second helical conveying track 3 follows from the transition 8 the second helical conveying track 3 downwardly to the discharge 7 and a return track upwardly along the outer side of the second helical conveying track 3 back to the transition 8, such as in case of conventional helical conveyors. The conveyor belt at the second helical conveying track 3 follows a small portion of the bridging track 4 between the transition 8 and the second helical conveying track 3. However, the return track of this conveyor belt does not have a horizontally oriented portion which is disposed below the bridging track 4 and extends beyond the vertically oriented portion of the associated return track with respect to the center line 3a of the second helical conveying track 3.

In fact the return track 5', 5" in the embodiment as shown in FIGS. 4 and 5 form a reversed-U-shaped portal which has a vertically oriented portion 5a', 5a" at each helical conveying track 2, 3, and which has a horizontally oriented portion 5b', 5b" which is disposed below the bridging track 4, in this embodiment parallel thereto.

The invention is not limited to the embodiments shown in the drawings and described hereinbefore, which may be varied in different manners within the scope of the invention. For example, it is conceivable that the bridging track and the horizontally oriented portion below it does not extend horizontally, but has a small angle with respect to horizontal. The tracks may also be non-linear. The number of turns of the helical conveyors may be larger or smaller. The distance between the bridging track and the return track may also be larger than the pitch between two turns of the helical conveying tracks, for example. Such a situation happens, for example, if the helical conveying tracks are relatively high because of the required track length and consequently the bridging track also lies at a high level, whereas the horizontally oriented portion of the return track may lie at a lower level in order to fulfill the required height of the underpass. Possibly the number of turns of the first helical conveyor may deviate from that of the second helical conveyor or the dimensions of the helical tracks may be different.

The invention claimed is:

1. A conveyor comprising two helical conveying tracks located at a distance from each other and a bridging track which connects the two helical conveying tracks to each other such that products can be transported upwardly via one helical conveying track, then via the bridging track to the other helical conveying track and subsequently downwardly via the other helical conveying track, wherein the conveyor is provided with a driveable endless conveyor belt which follows at least said one helical conveying track, at least a part of the bridging track and a return track of said one helical conveying track, wherein the return track of said one helical conveying track has a vertically oriented portion and a horizontally oriented portion, which horizontally oriented portion is disposed below the bridging track and extends beyond the vertically oriented portion with respect to a center line of said one helical conveying track, wherein a lower side of the conveyor belt is provided with guide elements which are guided via guiding rails along said one helical conveying track, the bridging track and the return track of said one helical conveying track.

2. The conveyor according to claim 1, wherein the endless conveyor belt follows both helical conveying tracks and the bridging track and wherein a return track of the other helical conveying track has a vertically oriented portion.

3. The conveyor according to claim 1, wherein a reversing member is disposed between the bridging track and the horizontally oriented portion of the return track of said one helical conveying track configured to reverse the transport direction of the conveyor belt.

4. The conveyor according to claim 3, wherein the reversing member is located halfway along the bridging track.

5. The conveyor according to claim 3, wherein the reversing member is located in an end portion of the bridging track.

6. The conveyor according to claim 1, wherein the bridging track extends substantially linearly.

7. The conveyor according to claim 1, wherein the conveyor belt is provided with slats which are mutually coupled and moveable with respect to each other.

8. The conveyor according to claim 7, wherein the slats are coupled to each other via a driveable endless connecting member.

9. The conveyor according to claim 1, wherein the guide elements comprise rollers which are received in a groove of the guiding rails.

10. The conveyor according to claim 1, wherein a minimum bending radius of the conveyor belt about its upper side is larger than about its lower side.

11. The conveyor according to claim 1, wherein a lower side of said one helical conveying track is provided with a supply and a lower side of the other helical conveying track is provided with a discharge, and wherein the horizontally oriented portion of said one helical conveying track extends above the supply and the discharge, and wherein the vertically oriented portion of the return track of said one helical conveying track extends at least partially above the supply and the discharge.

12. The conveyor according to claim 1, wherein the conveyor belt is provided with slats which are mutually coupled and moveable with respect to each other such that a minimum bending radius of the conveyor belt about its upper side is larger than about its lower side.

13. The conveyor according to claim 1, wherein the two helical conveying tracks comprise static helical frames along which the conveyor belt is driveable in the two helical conveying tracks.

14. The conveyor according to claim 1, wherein the conveyor belt follows said one helical conveying track, the conveyor further comprising a second conveyor belt that follows the other helical track, the second conveyor belt being separate from the conveyor belt, and wherein each conveyor belt is provided with slats which are mutually coupled and moveable with respect to each other such that a minimum bending radius of the conveyor belt about its upper side is larger than about its lower side.

15. The conveyor according to claim 1, wherein the conveyor belt follows said one helical conveying track, the conveyor further comprising a second conveyor belt that follows the other helical track, the second conveyor belt being separate from the conveyor belt, and wherein each helical conveying track comprises a static helical frames along which each associated conveyor belt is driveable.

16. A conveyor comprising two helical conveying tracks located at a distance from each other and a bridging track which connects the two helical conveying tracks to each other such that products can be transported upwardly via one helical conveying track, then via the bridging track to the other helical conveying track and subsequently downwardly via the other helical conveying track, wherein the conveyor is provided with a driveable endless conveyor belt which successively follows from a supply at a lower side of said one helical conveying track, the bridging track, the other helical conveying track to a discharge at a lower side of the other helical conveying track, and then a return track from the discharge to the supply, which return track extends at least partially between the bridging track and the supply and the discharge, wherein the return track forms a reversed-U-shaped portal which has a vertically oriented portion at each helical conveying track and which has a horizontally oriented portion which is disposed below the bridging track.

17. The conveyor according to claim 16, wherein a distance between the vertically oriented portions is larger than a diameter which is followed by one of the helical tracks.

18. A conveyor comprising two helical conveying tracks located at a distance from each other and a bridging track which connects the two helical conveying tracks to each other such that products can be transported upwardly via one helical conveying track, then via the bridging track to the other helical conveying track and subsequently downwardly via the other helical conveying track, wherein the conveyor is provided with two driveable endless conveyor belts, wherein a first conveyor belt successively follows from a supply at a lower side of said one helical conveying track, said one helical conveying track, a first portion of the bridging track and a first return track back to the supply, and wherein a second conveyor belt successively follows a second portion of the bridging track, the other helical conveying track to a discharge at a lower side of the other helical conveying track and subsequently a second return track from the discharge back to the second portion of the bridging track, wherein a horizontally oriented portion of the first and/or second return track extends between the bridging track and the supply and discharge, wherein the return tracks form a reversed-U-shaped portal which has a vertically oriented portion at each helical conveying track and which has a horizontally oriented portion which is disposed below the bridging track, and wherein a lower side of at least one conveyor belt is provided with guide elements which are guided via guiding rails along at least one of the helical conveying tracks, the bridging track and at least one of the return tracks.

* * * * *